United States Patent [19]
Tye et al.

[11] Patent Number: 5,308,636
[45] Date of Patent: May 3, 1994

[54] THICKENED AND GELLED SYSTEMS BASED ON STARCH AND GLUCOMANNAN

[75] Inventors: Richard J. Tye, Ramona, Calif.; Charles W. Bullens, Thomaston; Marylou G. Llanto, Rockland, both of Mass.

[73] Assignee: FMC Corporation, Philadelphia, Pa.

[21] Appl. No.: 778,862

[22] PCT Filed: Jun. 5, 1990

[86] PCT No.: PCT/US90/03178
§ 371 Date: Dec. 19, 1991
§ 102(e) Date: Dec. 19, 1991

[87] PCT Pub. No.: WO90/15544
PCT Pub. Date: Dec. 27, 1990

[51] Int. Cl.$^5$ .................. A23L 1/0522; A23L 1/05
[52] U.S. Cl. .................. 426/573; 426/578; 426/579; 426/661
[58] Field of Search .............. 426/578, 579, 661, 573

[56] References Cited
U.S. PATENT DOCUMENTS
4,859,484  8/1989  Bielskis ........................ 426/578
5,049,401  9/1991  Harada et al. ................ 426/578

FOREIGN PATENT DOCUMENTS
56-161319  12/1981  Japan .
8066134    12/1981  Japan .
80123494    3/1982  Japan .
163267      4/1983  Japan .
59-113867   6/1984  Japan .
82219310    6/1984  Japan .
62-259550  11/1987  Japan .
85236865   11/1987  Japan .
8731239     8/1988  Japan .
3-164142    7/1991  Japan ........................ 426/578
3-164147    7/1991  Japan ........................ 426/578

Primary Examiner—Jeanette Hunter
Attorney, Agent, or Firm—Mark A. Greenfield; Robert L. Anderson; Richrd E. Elden

[57] ABSTRACT

The viscosity of gellable starch-based systems is enhanced synergistically by admixing with the starch a glucomannan such as konjac. The improved viscosity is maintained at elevated temperature. Other food ingredients may be added to the mixture prior to gelation. Sols formed from the mixture exhibit improved cling to smooth surfaces such as poultry, fish and vegetables, and the resulting gels have high strength and stability even at elevated temperature. The gels become thermally stable by addition of an alkali either before or after gelling, or by freezing the gels with or without addition of an alkali. The compositions are useful in a wide variety of food and industrial applications.

9 Claims, 8 Drawing Sheets

THICKENED AND GELLED SYSTEMS BASED ON STARCH AND GLUCOMANNAN

This invention relates to the thickening and gelation of aqueous systems characterized by unexpectedly high viscosity development and resultant sols and gels which exhibit improved cling, gel strength and gel stability at elevated temperature. More particularly the invention relates to the enhancement at elevated temperature of the rheological properties of starch-based systems including gellable food products and other gellable systems.

Increasing the viscosity of many aqueous, starch based systems (for example foods such as soups) especially when hot, is desirable but not readily achieved with starch alone or with starch and other hydrocolloids without changing organoleptic and other properties of the system. Moreover, merely increasing the concentration of starch will not necessarily maintain or improve the cohesiveness of the system to a surface ("cling"), a desirable property when the starch-based system is intended as a coating for a smooth surface, such as batter or glaze coatings for vegetables, fish or poultry. It is also desirable that the increased viscosity and cling be maintained at elevated temperatures and that once gelled, the gel strength will be heat stable, that is, will be maintained at elevated temperature.

In accordance with the present invention the cling, gel strength and gel stability at elevated temperature of starch based aqueous systems can be enhanced along with dramatic and synergistic improvements in viscosity by admixing with the starch a glucomannan hydrocolloid such as konjac. Although konjac is known to increase the viscosity of aqueous systems even at elevated temperature, the enhancement of viscosity in the presence of starch is far in excess of the increase which can be produced using other hydrocolloids or starch alone. Furthermore, it has now been found that a glucomannan such as konjac has the ability to form heat stable gels, and this property can be used to impart unique thermal stability to starch systems alone or in the presence of other gums and stabilizers such as polysaccharides sulfated or otherwise. Moreover, the glucomannan/starch systems with or without other stabilizers, can form thermally reversible gels with enhanced gel strength and texture.

These properties vastly increase food and industrial uses for starch based systems. For example, by combining starch with amounts of glucomannan effective for synergistic increase in viscosity, films can be formed which are stable at elevated temperature and therefore can be used in batter and cooking applications under a wide range of conditions.

In summary, by adding a glucomannan to a starch based aqueous system in amounts requisite for synergistic increases in viscosity, the improved viscosity is maintained under both hot and cold conditions. The resultant composition exhibits improved cling, texture, gel strength and gel stability at elevated temperatures. Unique films therefore can be prepared from the compositions. The increased tensile strength and reduced density of the compositions renders them suitable for forming (as by extrusion) into a variety of products, both food (for example, macaroni and formed snack items) and non-foods (for example, dentifrices, air freshener gels and films).

The appended drawings (FIGS. 2-8) are plots illustrative of the invention, and are further referenced below.

FIG. 1 is a comparative example of one embodiment of the invention while

FIG. 2 describes the synergistic viscosity improvement over a wide temperature range for combinations of konjac and different starches.

Figure 1:
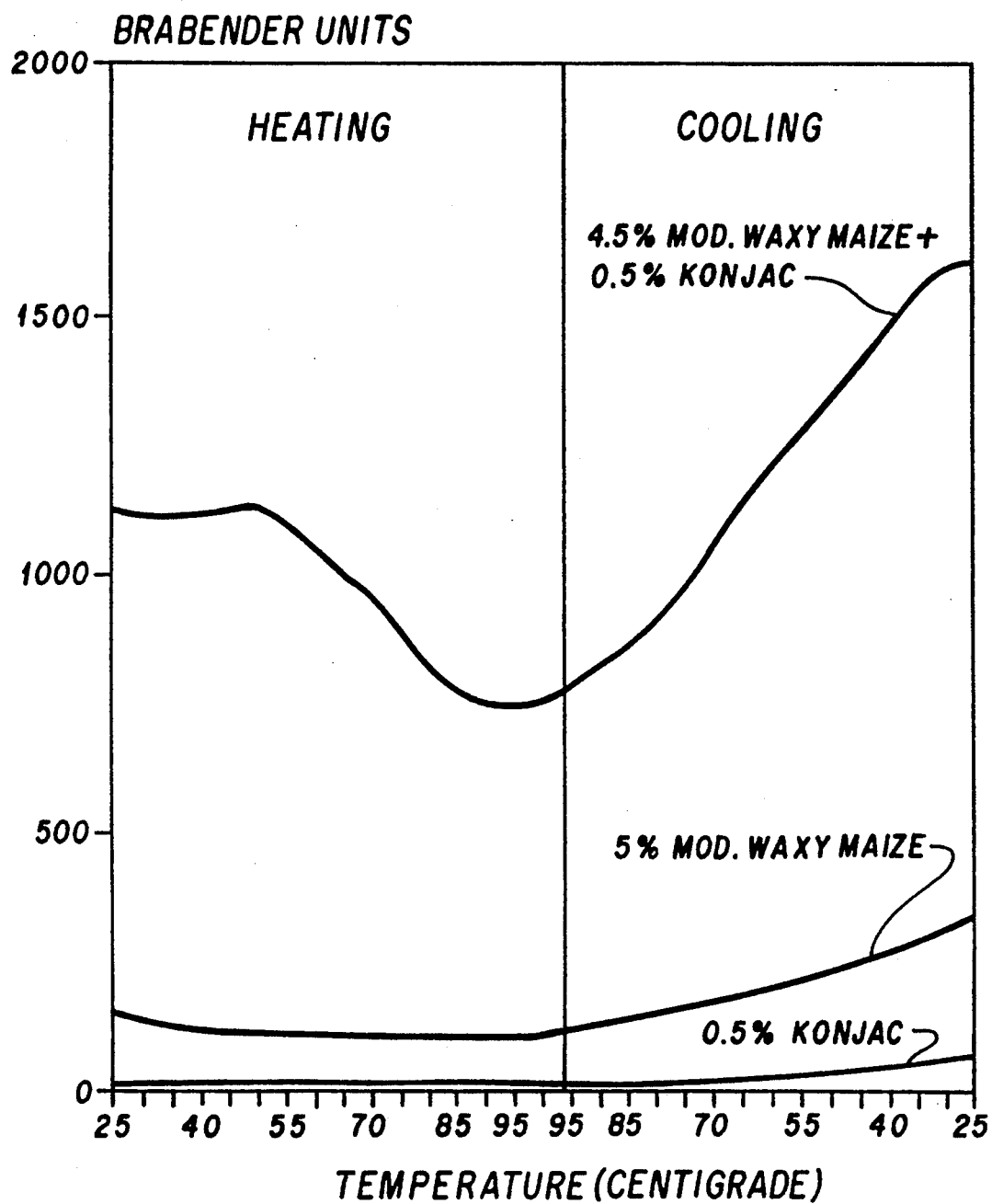
Figure 2:
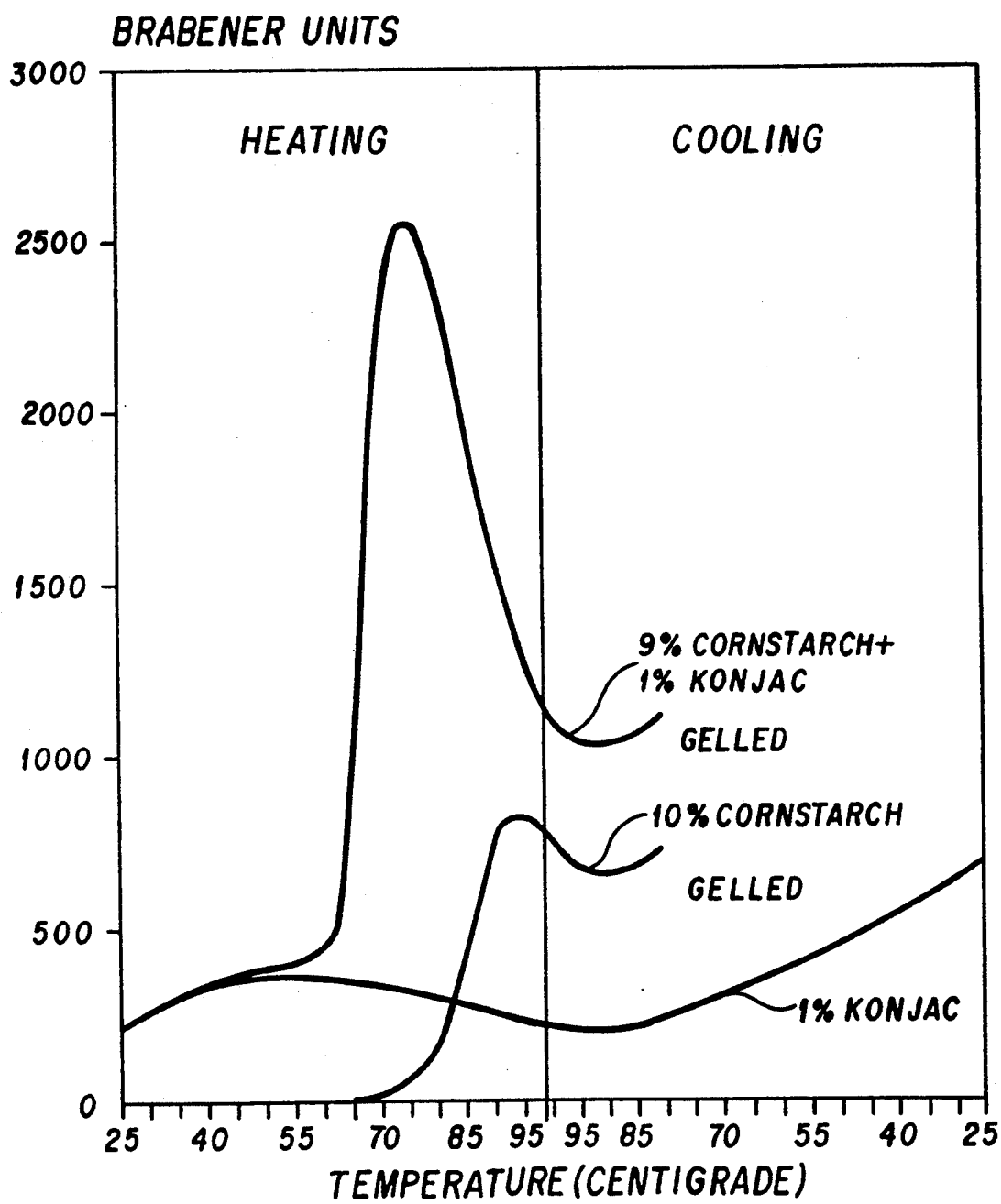

The Brabender ® amylo/graph viscosity data of FIGS. 1 and 2 were determined in a manner standard in the starch industry. The Brabender instrument is, in essence, a heating chamber within which rotates a sample bowl. The sample bowl has fixed tines rising from its bottom which, during rotating, pass closely by a set of hanging tines which are connected to a torsion head. The motion of the hanging tines is recorded by a pen attached to the torsion head. The deflection depends on the momentum transfer between the rotating and hanging tines. This transfer depends on the apparent viscosity or thickness of the fluid held in the bowl. The bowl temperature is thermostatically controlled and can be set to a constant rate of 1.5° C. per minute.

Konjac is the most common of the glucomannans with which the invention may be practiced and will be referenced throughout this specification, with the understanding that other glucomannans are encompassed by the invention as well, as equivalent to konjac Konjac is the name given either to the ground winnowed tubers of the Amorphophallus species, especially A. rivieri and its varieties, or to the glucomannan extract obtained therefrom. The konjac, or other glucomannan, can be used in any form (chopped, ground, slurried, etc.) but for ease of blending, a powder (flour) is preferred, having a mesh size of 40 (ASTM Standard E 11-87) or smaller, for example, at least 80% in the 60–100 mesh ange.

The starches to be used in conjunction with konjac are well known materials and can be native, modified, pre-gelatinized, or any mixture thereof.

In accordance with the invention, starch and konjac are admixed in any suitable manner in an aqueous medium (or starch and konjac are dry blended, the blend then being admixed with water) to provide a viscous sol, the viscosity vastly exceeding the viscosity of either component alone. The viscosity profile during cooking depends on the nature of the starch. Viscosity enhancement will occur without heating if a cold swelling starch is employed. FIG. 1 demonstrates this for modified waxy maize starch (National Starch Ultra tex 4 ™). When native corn starch (National Starch Melojel ™) is used with konjac, heat is required for gelling. FIG. 2 illustrates viscosity increase for this system when gelling begins.

Figure 3:
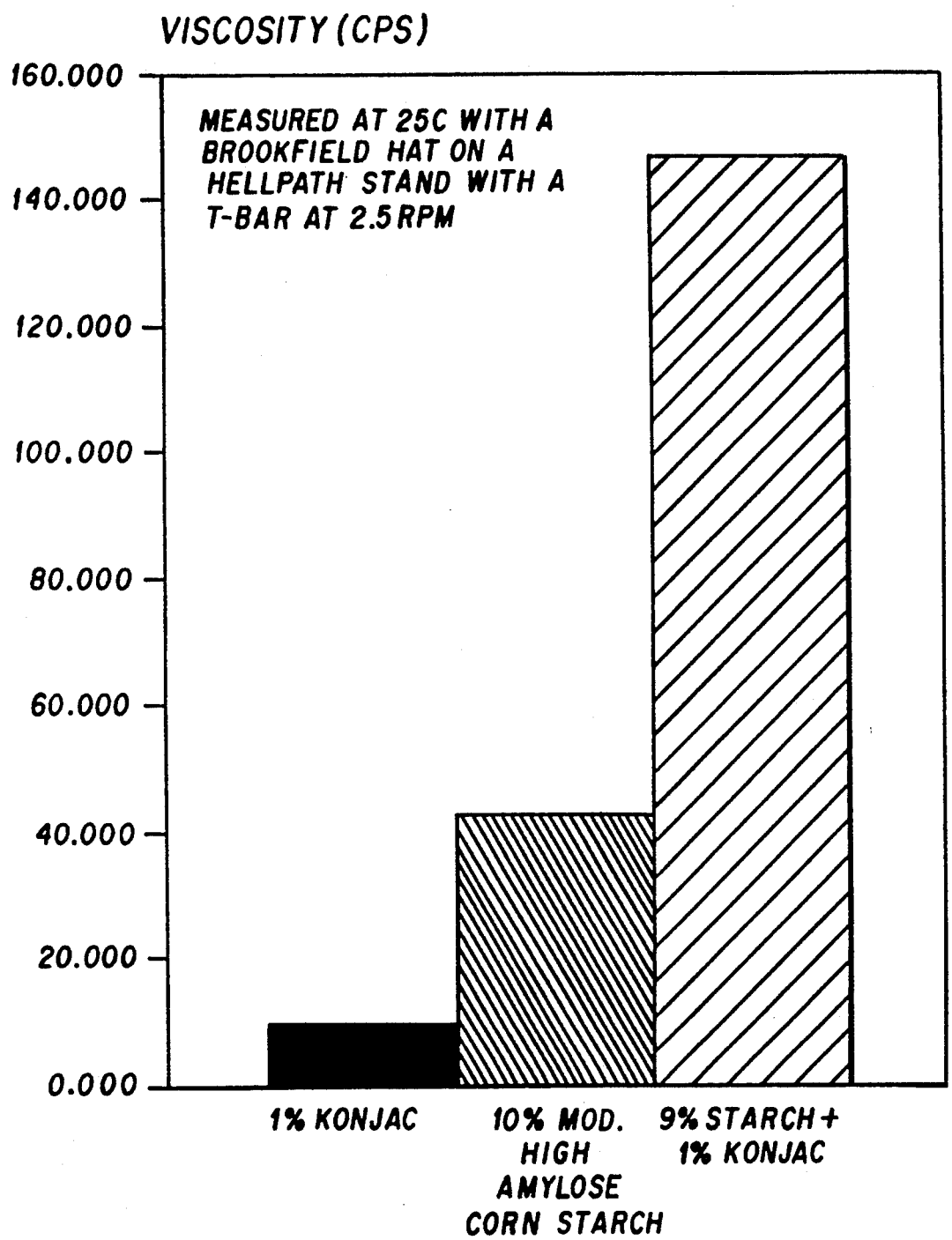
FIG. 3 shows synergism in viscosity at a relatively cold temperature (25° C.) after prior heat treatment of the materials.
Figure 4:
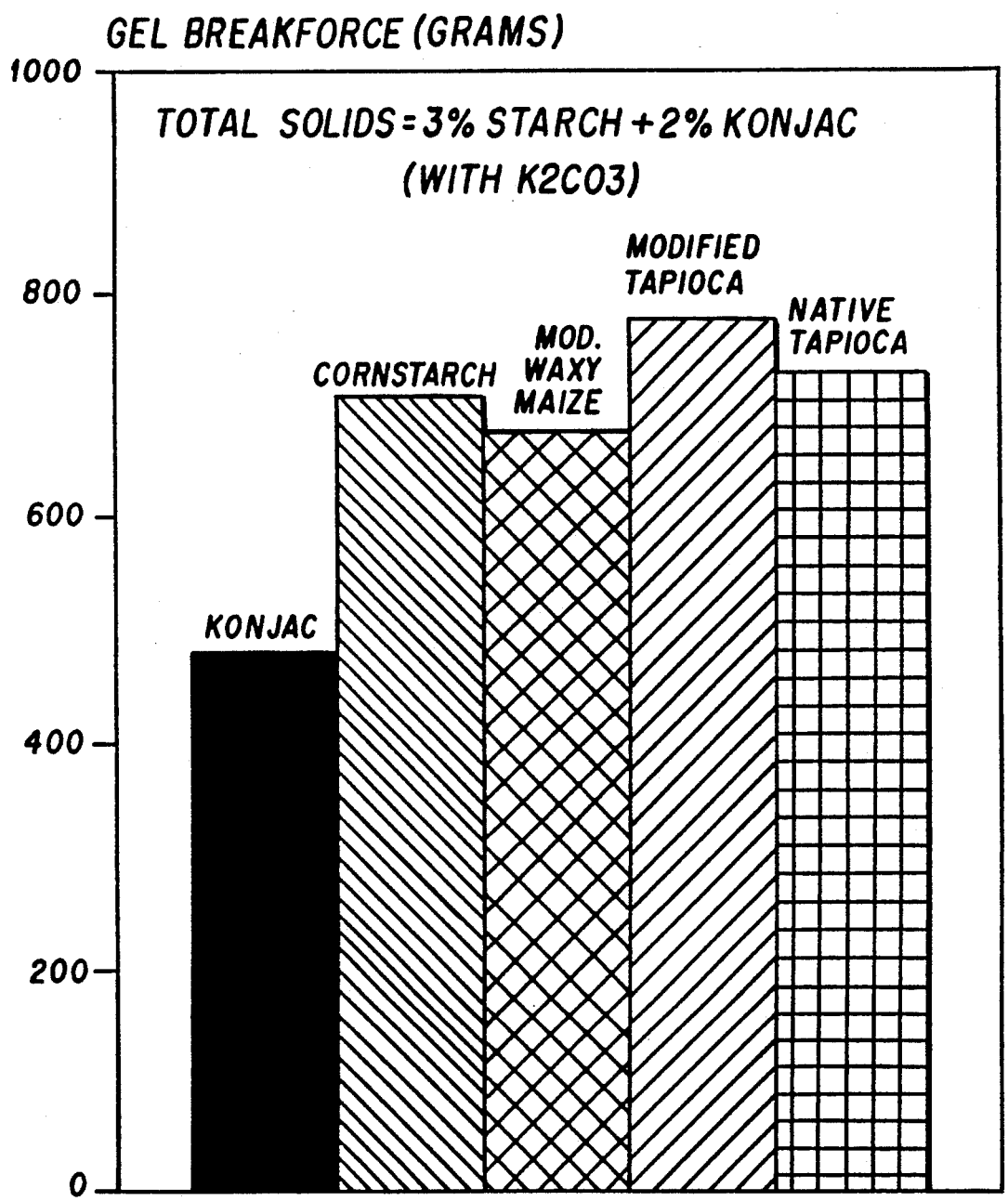
FIG. 4 shows that various starches enhance gel strength attributable to konjac.

As demonstrated in FIG. 3, viscosity enhancement is maintained after heating and cooling. It is known that konjac alone will form heat stable gels is konjac gels are treated with mild alkali. However, when combined with starch the strength of the heat stable gels increases, as demonstrated in FIG. 4. And non-corrosive alkaline materials can be used. However, in the case of foods the alkali should, of course, be a food quality alkali such as an alkali metal carbonate metal or phosphate such as potassium carbonate, sodium carbonate, sodium bicarbonate, and any of the food phosphates. Stronger alkalis may be used in reduced amounts. A pH of about 7.5-9.5 is sufficient.

Figure 5:
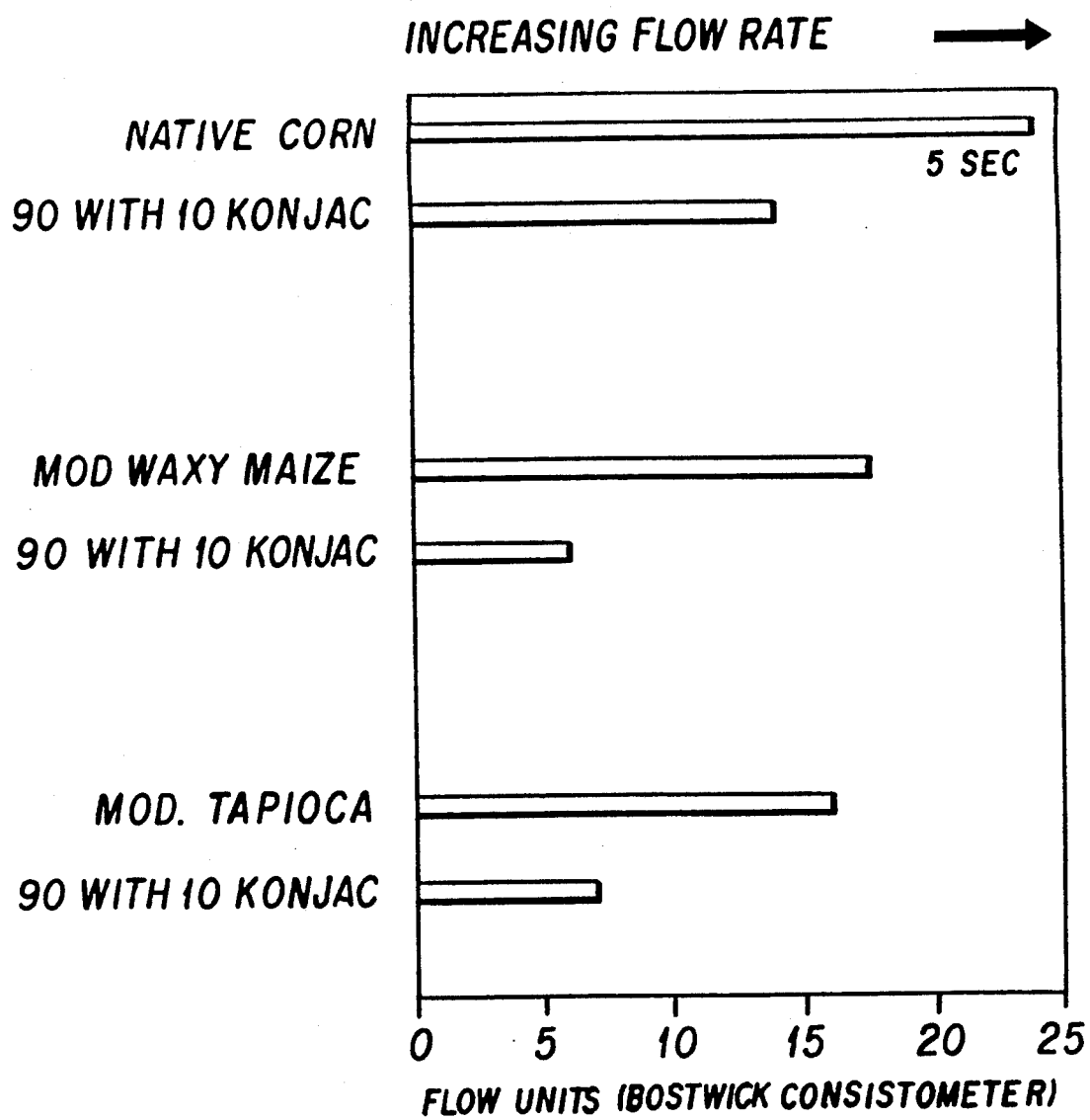
FIG. 5 shows that konjac improves cling and reduces flow of aqueous starch compositions.
Figure 6:
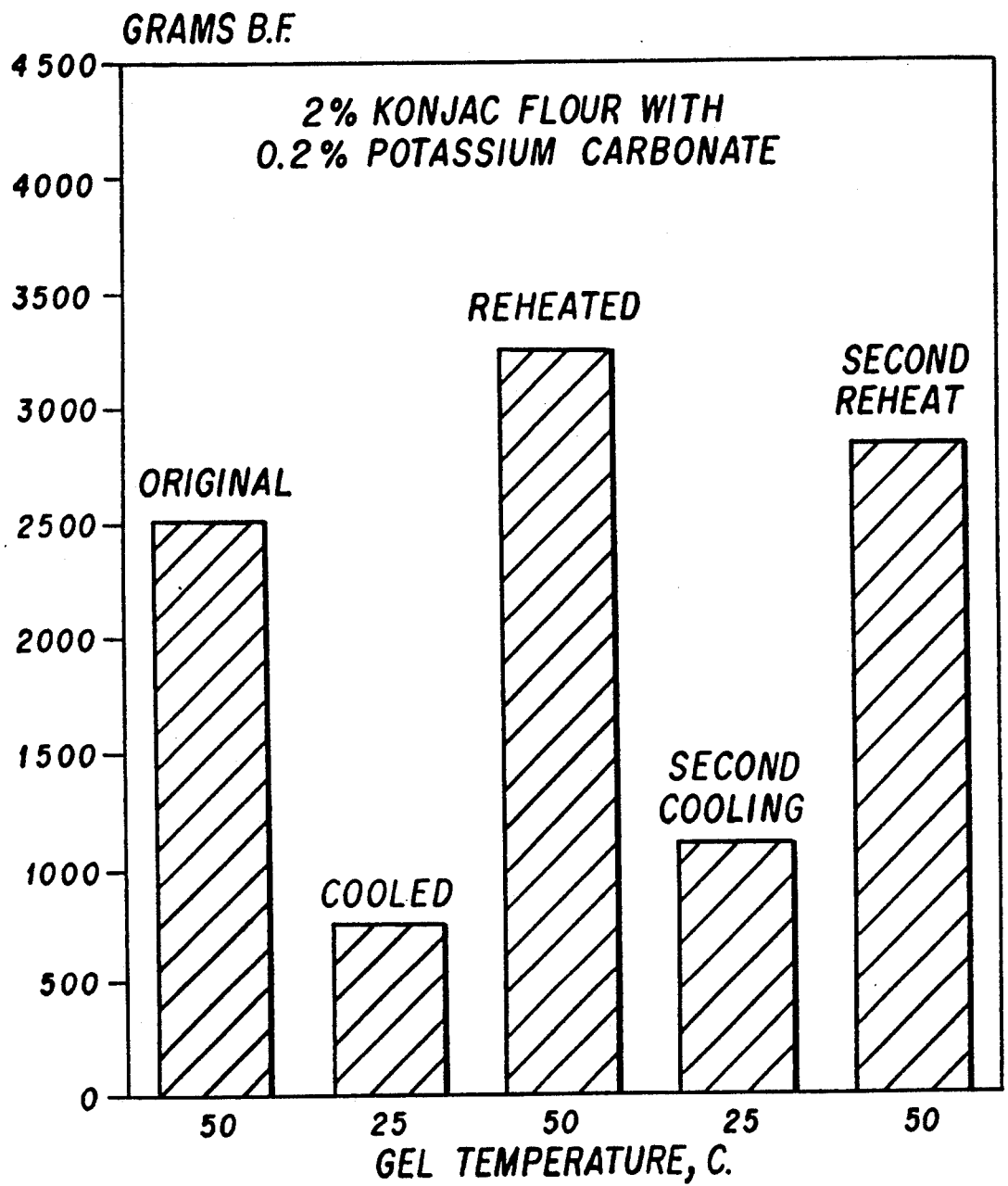
FIG. 6 shows that konjac imparts higher gel strength to hot gels than to cold gels.
Figure 7:
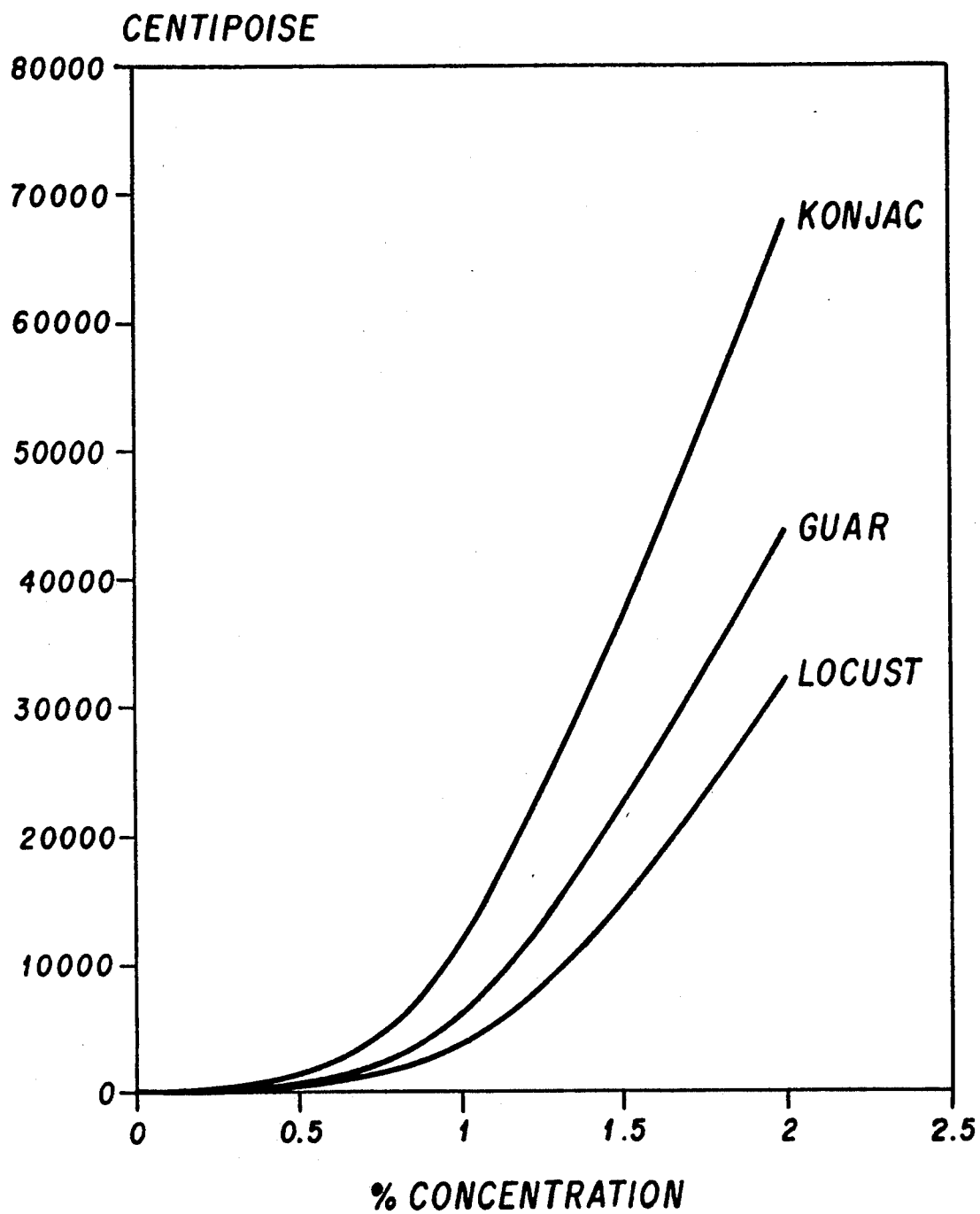
FIG. 7 is a viscosity/concentration plot comparing viscosity of konjac sols and sols of other hydrocolloids.

The increase in viscosity and improvement in surface properties of starch/konjac systems reduces flow and increases the cling of a starch/konjac slurry poured onto a surface. FIG. 5 demonstrates this property using a Bostwick consistometer. The Bostwick consistometer is a graduated horizontal plane with a spring loaded gate at one end. The gate holds back a measured amount of material which begins to flow when the gate is raised. Flow is allowed to take place for a measured interval of time after which the flow distance is measured. For rapid flow as with native corn starch alone, the time is measured when the material reaches the end of the instrument.

Konjac/starch gels are stable to boiling water in acid or alkaline media and actually exhibit increased strength as the temperature rises. This follows the trend for konjac-only gels and is opposite the trend for konjac/carrageenan systems.

All konjac/starch gels are stable in acid to pH down to 3 at temperatures up to boiling.

While not fully understood, it is believed that the synergistic viscosity effects and other improvements of the invention are probably due to two factors: a concentration effect and hydrogen bonding between the hydroxyl groups of the glucomannan and these of the starch. The concentration effect arises from the steep viscosity versus concentration profile exhibited by konjac alone.

The relative amounts of glucomannan and starch to obtain synergistic improvements in viscosity of aqueous systems prepared for these components will depend on the type of glucomannan, starch and any other component of the system. Generally, for a konjac/starch system without other food or active ingredients, the glucomannan: starch weight ratio may range from about 100:1 to 1:100, preferably about 20:1 to 1:20, more preferably about 2:1 to 1:10. In the case of foods, the amount of the starch will normally be the same or exceed the amount of the konjac, and therefore the glucomannan:starch ratio will range from about 1:1 to about 1:20, preferably about 1:2 to about 1:10. The glucomannan/starch blend may be used in food and other formulations in any suitable amounts, for example, about 0.01%-10% by weight on total formulation A variety of methods may be used to prepare the aqueous systems of the invention. Following are representatives methods of preparing sols and gels. In those systems requiring high gel strength (for example, when used as dessert gels), care should be taken to avoid excessive sugar (over 25 wt. %) or other ingredients which can reduce gel strength.

Preparation of Sols

1. Dry Blending

Prepare a dry blend of konjac and starch in the weight ratio of 20:1 to 1:20 konjac:starch (preferably 10:1 to 1:10) based on the formula weight of starch. Blend the starch/konjac mixture with the other formula ingredients and disperse into water in accord with the dictates of the starch ingredient formulation. No special precautions or steps are required for the konjac.

2. Pre-Hydrate The Konjac, Low Shear

Prepare a konjac sol by dispersing the konjac into the formula amount of water and agitating for 15 minutes to swell the konjac sufficient to prevent settling. Konjac should be added to give a final weight ratio of konjac to starch of 20:1 to 1:20 konjac:starch (preferably 10:1 to 1:10) based on the formula weight of starch. Add the rest of the ingredients and continue with the processing. No special techniques are required because of the presence of the konjac.

3. Pre-Hydrated Konjac, High Shear

Prepare a konjac sol by dispersing the konjac into the formula amount of water and subject the dispersion to high intensity shear as would occur in an emulsifier of the Silversen Type. Full hydration takes between 5 and 30 minutes (preferably 15 minutes) depending on the initial temperature of the water (25° C. to 100° C., preferably 85° C.). Konjac should be added to give a final weight ratio of konjac to starch of 20:1 to 1:20 konjac:starch (preferably 10:1 to 1:10) based on the formula weight of starch. Add the rest of the ingredients and continue with the processing. No special techniques are required because of the presence of the konjac.

4. Addition of Konjac to a Hot System, Low Shear

Konjac can be added to hot or boiling water with no problems either before or after the addition of the other ingredients to give a weight ratio of konjac and starch of 20:1 to 1:20 konjac:starch (preferably 10:1 to 1:10) based on the formula weight of starch. Add the rest of the ingredients and continue with the processing. No special techniques are required because of the presence of the konjac.

Gels may be prepared from any of the foregoing sols as follows:

Preparation of Gels

1. Thermally Stable Gels (a) Prepare sols of the konjac/starch systems as above. Allow the konjac-starch system to cool and add mild alkali (salts of carbonates or phosphates, or hydroxides) to bring the pH between 7.5 and 11 preferably greater than 9. The preferred alkali is potassium carbonate. Stir the alkaline mixture to give a homogeneous solution and heat quiescent to between 50° and 100° C. for 15 minutes to 2 hours preferably 80° C. for 1 hour. The system must not be stirred and the gel forms hot.

(b) Alternatively, prepare a thermally reversible gel as in gel preparation method 2 below and steep in alkali at pH 7.5 to 11, preferably greater than 9, for one to six hours, preferably 2 hours, at a temperature of between 15° C. at 60° C., more preferably 40° C.

2. Thermally Reversible Gels

Prepare the konjac sols as above using a gelling starch or starch with a gelling polysaccharides. Allow the hot sols to gel upon cooling. No alkali is required.

3. Thermally Stable Gels Upon Freezing

Konjac/starch systems after hydration may be frozen to form gels which are heat-stable. The type of starch may be modified or native. The gels are prepared as follows:

Prepare a blend of konjac and starch in the weight ratio of 1:20 to 20:1 (preferably 1:10 to 10:1). Blend and disperse in water. Apply shear or heat, or both, to hydrate both components. (Solutions of each may be prepared separately and mixed together instead). Freeze at temperatures below 0° C. (preferable −10° to −20° C.). This results in the formation of a gel which is heat stable and is also resistant to alkali and acid. The gel may be given additional firmness by treatment with an alkali such as potassium carbonate.

Applications

The improved gelling systems of the invention have particular application in food, animal and industrial systems such as confectionery, water or milk based foods, fruit glazes, pie fillings, soups, sauces, gravies, pet foods, icings, frostings and other systems containing starch as a major or minor component. Industrial applications include paper coatings, adhesives and films. The following non-limiting examples illustrate methods of preparation of sols and gels, and formulations useful for many of such applications. In these examples the konjac is a particulate material having a particle size distribution such that at least 80% of the particles are 40–100 U.S. Standard mesh.

EXAMPLE 1

Batter Mix

|  | Wt. % |
|---|---|
| Corn Flour | 51.35 |
| Wheat Flour | 25.00 |
| Modified High Amylose Corn Starch | 17.00 |
| Konjac | 1.00 |
| Salt | 3.00 |
| Whole Egg Solids | 1.00 |
| Sodium Acid Pyrophosphate | 0.90 |
| Sodium Bicarbonate | 0.70 |
| Pepper | 0.05 |
|  | 100.00% |

The batter mix is prepared as follows. Add 2 parts water to 1 part batter mix. Mix until thoroughly dispersed. Dip food product into the wet batter. Deep fat fry at 350° F.

The konjac enhances the viscosity of the batter mix, reducing batter drip. A uniform coating after frying is obtained, which is uniformly brown and crisp.

EXAMPLE 2

White Sauce

|  | Wt. % |
|---|---|
| Skim Milk | 85.83 |
| Butter/Margarine | 11.00 |
| Modified Waxy Maize Starch | 2.00 |
| Konjac | 0.50 |
| Salt | 0.60 |
| Pepper | 0.07 |
|  | 100.00% |

The sauce is prepared as follows. Dry blend the konjac, starch, salt and pepper. Melt butter or margarine over low heat. Add the dry ingredients to the melted butter and stir well. Slowly add the milk. Heat to boiling over medium heat, stirring constantly. Hold and stir for about one minute.

A thick, smooth sauce is obtained, which retains its high viscosity hot or cold. No fat separation is observed.

EXAMPLE 3

Pudding

|  | Wt. % |
|---|---|
| Low-fat Milk | 85.5 |
| Corn Starch | 2.0 |
| Konjac | 0.50 |
| Sugar | 12.00 |
|  | 100.00% |

The pudding is prepared as follows. Disperse the ingredients in cold milk. Heat to boiling. Cool to 5° C.–25° C. to set the pudding.

A creamy product with enhanced viscosity is obtained.

EXAMPLE 4

Cake Glaze

|  | Wt. % |
|---|---|
| Modified Tapioca Starch | 2.5 |
| Konjac | 0.25 |
| Sugar (Dextrose) | 20.0 |
| Sodium Citrate | 0.15 |
| Citric Acid | to pH 3.8–4.0 |
| Water | to 100.0% |

The glaze is prepared as follows. Disperse the starch and konjac in water. Heat to boiling. Add the sugar and sodium citrate. Adjust pH to 3.8–4.0 with citric acid. Apply on fruit pieces over cake. Allow to set at room or refrigerated temperature.

A glaze is formed, having increased hot viscosity and improved cling, which minimizes solution "run off". The glaze is clear, with good flavor release of the fruit.

EXAMPLE 5

Pasta/Macaroni

|  | Wt. % |
|---|---|
| Semolina Flour (70% Starch) | 70 |
| Konjac | 0.5 |
| Salt | 0.75 |
| Vegetable Oil | 4.25 |
| Water | to 100% |

The product is prepared as follows. Disperse the konjac in water, hydrate by either mixing cold or heating to at least 85° C. Mix flour, salt, oil, and konjac sol. Mix gradually, kneading into a soft smooth dough. Run the dough through a pasta cutter. Dry in a humidity controlled oven.

The resulting pasta has increased tensile strength and is more resistant to breaking. It also has increased resistance to rehydration, making it more stable in hot water.

EXAMPLE 6

Extruded Snack

|  | Wt. % |
| --- | --- |
| Potato Flakes | 77.0 |
| Potato Starch | 2 |
| Konjac | 0.3 |
| Salt | 2 |
| Baking Powder | 2 |
| Cheese Powder | 2.5 |
| Water | to 100% |

The product is prepared as follows. Disperse the konjac in the available water. Mix the konjac slurry with the rest of the ingredients. Extrude through an extruder set at the appropriate temperature and screw speed.

An extruded product is formed exhibiting higher tensile strength, higher viscosity, and greater expansion (lower density).

EXAMPLE 7

Air Freshener Gel

|  | Wt. % |
| --- | --- |
| Gelling Agent: | |
| Kappa Carrageenan | 43 |
| Konjac | 24 |
| Modified Starch | 10 |
| Potassium Chloride | 18 |
| Calcium Sulfate | 5 |
| Air Freshener Gel Formulation: | |
| Gelling Agent | 1.5 |
| Guar or CMC (optional) | 1.00 |
| Perfume Oil | 1.5 |
| Preservative | 0.10 |
| Dye/Pigment | 0.01 |
| Water | 95.89 |

The product is prepared as follows. Dry blend the gelling agent and guar or CMC (carboxymethyl cellulose). until fully dissolved. Add the perfume oil. Pour into molds or canisters.

Gels with high gel strength and controlled syneresis are formed. The perfume is gradually released into the air over a long period of time.

EXAMPLE 8

Tomato Sauce

|  | Wt.% |
| --- | --- |
| Tomato Paste | 30 |
| Modified Starch | 1.75 |
| Konjac | 0.5 |
| Sugar (Sucrose) | 10 |
| White Vinegar | 15 |
| Lemon Juice | 6.5 |
| Worcestershire Sauce | 6 |
| Chili Powder | 1.5 |
| Salt | 2.0 |
| Seasonings | 1.0 |
| Water | to 100% |

The sauce is prepared as follows. Make a blend of the dry ingredients. Mix liquid ingredients together. Heat up to at least 85° C. Add the dry ingredients with stirring. Bring to a boil.

The resulting sauce (pH=3.5–4.0) is thick and smooth, with minimal syneresis. The viscosity of the product is maintained during storage.

EXAMPLE 9

Surimi Analogue

|  | Wt. % |
| --- | --- |
| Surimi | 65 |
| Salt (NaCl) | 2.0 |
| Potato Starch | 5 |
| Konjac | 0.2–0.5 |
| Potassium Carbonate | 0.10 |
| Water (about 5° C.) | to 100% |

The product is prepared as follows. Thaw the frozen surimi in 4°–6° C. refrigerator. Chop surimi in silent cutter until finely minced. Add the salt and about one-third of the water. Add the carbonate. Add the starch and the rest of the water. Mix for about 5 min. Stuff into casing or place in a mold. Cook in an 85°–90° C. water bath or in a steam bath for about 40 minutes. Cool the product and refrigerate or freeze.

The product has a higher gel strength than the control (no konjac). Syneresis after three freeze-thaw cycles is lower.

EXAMPLE 10

Cream of Chicken Soup

|  | Wt. % |
| --- | --- |
| Non-fat Dry Milk Solids | 4.0 |
| Chicken Broth | 1.5 |
| Chicken Meat | 2.0 |
| Modified Starch | 1.5 |
| Konjac | 0.5 |
| Cream Solids | 0.5 |
| Salt | 0.15 |
| Seasoning | 0.05 |
| Water | to 100% |

The soup is prepared as follows. Add the dry ingredients to water. Mix well. May be heated to boiling for immediate use or may be heated to at least 85° C., sealed in cans and autoclaved.

A rich, creamy soup is formed having uniform consistency and relatively high viscosity even when hot.

EXAMPLE 11

Meat Sauce Topping

|  | Wt. % |
| --- | --- |
| Tomato Paste | 40 |
| White Vinegar | 20 |
| Modified Starch | 1.0 |
| Konjac | 0.5 |
| Seasonings | 7.5 |
| Water | to 100% |

The topping is prepared as follows. Make a blend of the dry ingredients. Mix liquid ingredients together. Heat to boiling. Add the dry ingredients with stirring. Bring back to a boil. Apply on meat product. Freeze at −20° C.

The resulting glaze/topping gels on the meat and upon cooking or reheating remains gelled. This helps to retain moisture in the meat.

In a particular embodiment of this invention it has been found that especially effective interaction between mixtures of certain starches and galactomannan gums at elevated temperatures to provide a synergistic increase in viscosity of the resultant sol may be obtained when (1) the galactomannan gum is konjac, (2) the starches possess a highly linear molecular structure, (as contrasted with those starches having branched-chain structures) and (3) when the weight ratio of starch to konjac in the sols, and resulting gels, is about 8.5–9.5:1, and preferably about 9:1.

That is to say, it has been found that, unexpectedly, highly linear starches such as amylose or high amylose starches show a highly synergistic interaction with certain amounts of konjac when dry mixtures of these two components are dispersed in water to form a sol at elevated temperatures, thereby providing significantly higher viscosities of the resulting mixture than what would be expected from the viscosity of each component alone. Typical of these linear starches are native cornstarch, wheat starch, cornstarch, high amylose starch, or like highly linear starches. By high amylose starch is meant one where the amylose, having a highly linear molecule, comprises about 50%–70% by weight of the starch, while amylopectin, which is highly branched, comprises the remainder. Equally effective for purpose of this invention is cornstarch, particularly native cornstarch, which normally contains about 28% by weight of amylose, with the remainder comprising amylopectin. Other starches which may be effectively employed with the konjac for purposes of this invention include such materials as wheat starch (amylose content of about 28%). Waxy maize starch, on the other hand, comprises virtually 100% highly branched amylopectin and is an example of the type of starches which are ineffective in this novel aspect of the invention.

By the term linear starch is meant a starch composition containing synergistically effective amounts of linear starch molecules. It will be evident that the exact percentage of linear starch in any given starch composition is not critical and may vary widely from 100% linear starch down to about 28% in regular cornstarch. Thus, what principally determines what is an effective amount of linear starch content in this composition depends on whether it produces a synergistic effect with konjac at the weight ratios and temperatures described herein.

The temperatures at which peak viscosities are obtained will vary somewhat depending mostly upon the nature of the starch employed, but are generally from about 55°–5° C., and preferably about 75°–90° C. At these temperatures and viscosities these sols are especially useful when added to other food materials in known quantities in the preparation of thickened foodstuffs such as hot gravies, soups, sauces, glazed and the like, as well as custards, gelled desserts, batters and like materials.

After the desired peak viscosity and temperatures are obtained, the sol may then be cooled if desired and converted into gels and/or films as described above.

Figure 8:
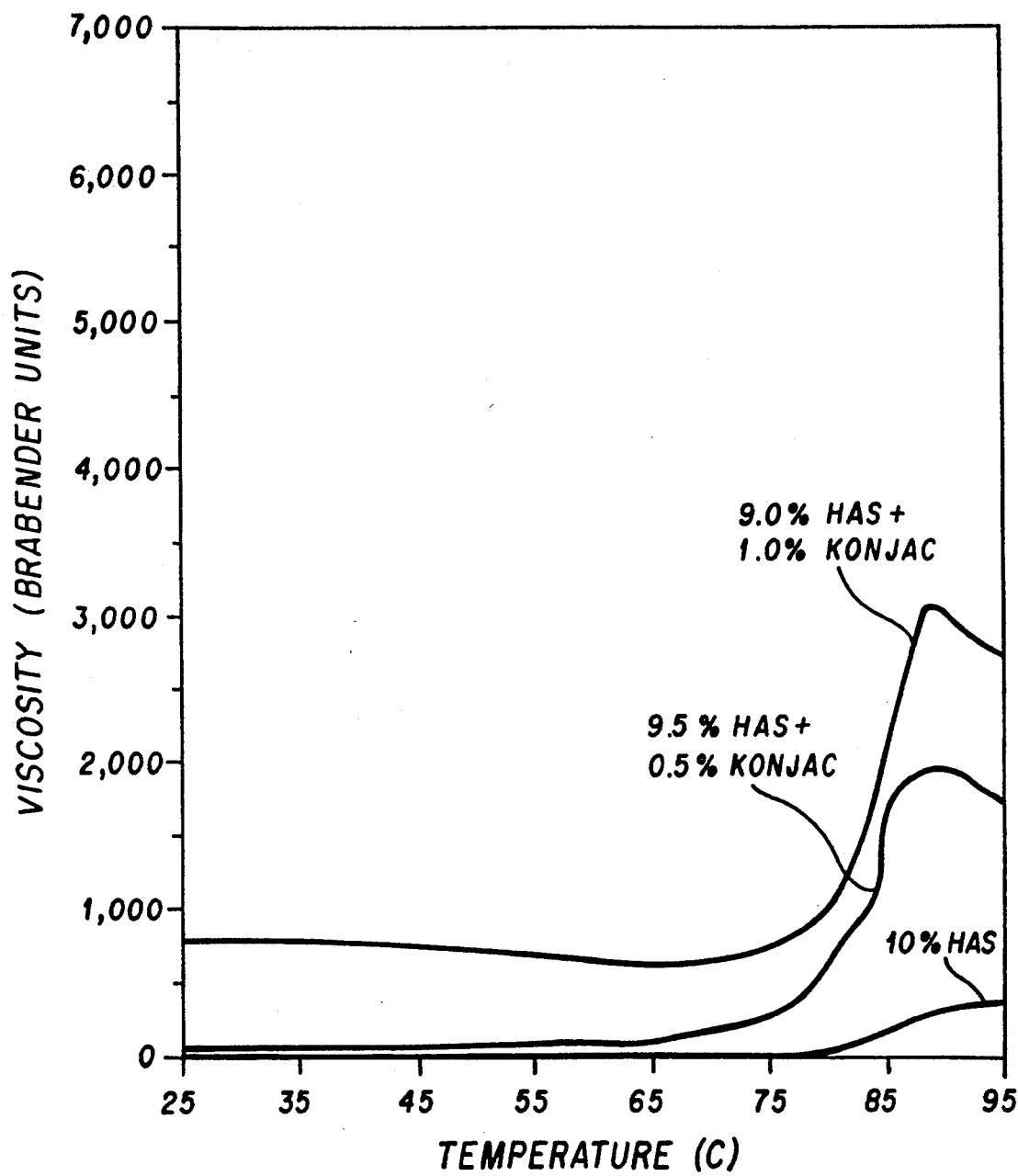
FIG. 8 represents the synergistic viscosity of konjac and high amylose starch sols at elevated temperatures, wherein the high amylose starch ("HAS") contains 50% amylose.

Foregoing FIGS. 2 and 8 are illustrative of preferred embodiments of this aspect of the invention, while FIG. 1, which uses waxy maize starch, is a comparative example demonstrating a lack of synergism between that starch and konjac.

We claim:

1. A composition comprising a dry mixture of a linear starch and konjac in weight ratios of 8.5–9.5:1 of starch to konjac thereby providing a synergistic increase in viscosity when an aqueous dispersion of the mixture is heated to a temperature of 55° C. to 95° C.

2. The composition of claim 1 wherein the starch is native cornstarch or high amylose starch.

3. The composition of claims 1 or 2 wherein the ratio of starch to konjac is 9:1.

4. The composition of claims 1 or 2 wherein the temperature of the aqueous dispersion is 75° C. to 95° C.

5. A composition comprising an aqeuous mixture of a linear starch and konjac thereby providing a synergistic increase in viscosity of an aqueous dispersion of composition at weight ratios of starch to konjac in the range of from 8.5–9.5:1 and at temperatures of from 55° C. to 95° C.

6. The composition of claim 5 wherein the starch is native cornstarch or high amylose starch.

7. The composition of claims 5 or 6 wherein the ratio of starch to konjac is 9:1.

8. The composition of claims 5 or 6 wherein the temperature of the aqueous dispersion is from 75° C. to 90° C.

9. The composition of claims 5 or 6 wherein the composition further comprises at least one food material, thereby providing a food product.

* * * * *